(12) United States Patent
Lin

(10) Patent No.: US 6,356,024 B1
(45) Date of Patent: Mar. 12, 2002

(54) LIGHTING DEVICE FOR NORMAL AND EMERGENT USE

(76) Inventor: Chun Ting Lin, No. 100, Lane 110, Chang Shing 1st Street, Ren Der Village, Tainan Hsien (TW)

( * ) Notice: Subject to any disclaimer, the term of this patent is extended or adjusted under 35 U.S.C. 154(b) by 0 days.

(21) Appl. No.: 09/737,554

(22) Filed: Dec. 18, 2000

(51) Int. Cl.$^7$ .............................................. H05B 37/00
(52) U.S. Cl. ....................... 315/86; 315/209 R; 315/224
(58) Field of Search ............................... 315/86, 209 R, 315/224, 225, 74, 75, 307

(56) References Cited

U.S. PATENT DOCUMENTS

| | | | | |
|---|---|---|---|---|
| 5,252,891 A | * | 10/1993 | Huang | 315/86 |
| 5,811,942 A | * | 9/1998 | Pedretti | 315/312 |
| 6,072,285 A | * | 6/2000 | Chen | 315/307 |

* cited by examiner

Primary Examiner—Don Wong
Assistant Examiner—Jimmy T. Vu

(74) Attorney, Agent, or Firm—Rosenberg, Klein & Lee

(57) ABSTRACT

A lighting device comprises a lighting unit, a stabilizer electrically connected to the lighting unit, and a circuit board. The circuit board comprises a detecting circuit connected to a power source; a converter electrically connected to the detecting circuit and a battery unit; a switch for selectively conducting the lighting unit with one of the power source and the converter; an isolating circuit electrically mounted between the battery unit and the power source; a rectifier mounted in front of the battery unit and connected to the power source, the battery unit being electrically connected to the rectifier so as to be charged during a normal illumination state; and a relay connected to the switch for selectively controlling conduction with one of the power source and the converter. When at the normal illumination state, electric current from the power source passes through the stabilizer to turn on the lighting unit, and the power source charges the battery unit. When at an emergent illumination state, upon detection of interruption service by the detecting circuit, the relay activates the switch of the lighting unit to be non-conductive with the power source and be conductive with the converter, and the converter is empowered by the battery unit.

1 Claim, 3 Drawing Sheets

LIGHTING DEVICE FOR NORMAL AND EMERGENT USE

BACKGROUND OF THE INVENTION

1. Field of the Invention

The present invention relates to a lighting device for both normal and emergent use.

2. Description of the Related Art

Electricity is important for providing illumination in public and household areas. In addition to normal lighting devices, emergent lighting devices are also required to provide illumination when power supply is not available due to, e.g., planned or accidental interruption of service. An emergent lighting device is an independent illuminating device that is charged by a power source to store electricity in a battery unit. The emergent lighting device will be automatically turned on when normal power supply is not available.

FIG. 1 of the drawings illustrates a lighting device 1 that includes an emergent light and a normal ordinary light that share a common light base 13 and a light hood 14. An emergent lighting element 12 is connected to an uninterrupted power supply 15 such that the lighting device 1 may be used for both normal and emergent illumination. However, the lighting element 11 for normal illumination and the emergent lighting element 12 are separate elements although they share a common light base 13. The lighting device 1 still has to include at least two sets of lighting elements for normal and emergent illumination, respectively, which is troublesome and costly.

SUMMARY OF THE INVENTION

It is the primary object of the present invention to provide an improved lighting device for both normal and emergent use.

A lighting device in accordance with the present invention comprises a lighting unit, a stabilizer electrically connected to the lighting unit, and a circuit board. The circuit board comprises a detecting circuit having a first end electrically connected to a power source; a converter including a first end electrically connected to a second end of the detecting circuit, the converter being electrically connected to a battery unit; a switch for selectively conducting the lighting unit with one of the power source and the converter; an isolating circuit electrically mounted between the battery unit and the power source; a rectifier mounted in front of the battery unit and electrically connected to the power source, the battery unit being electrically connected to the rectifier so as to be charged during a normal illumination state; and a relay electrically connected to the switch for selectively controlling conduction with one of the power source and the converter.

When at the normal illumination state, electric current from the power source passes through the stabilizer to turn on the lighting unit, and the power source charges the battery unit.

When at an emergent illumination state, upon detection of interruption service by the detecting circuit, the relay activates the switch of the lighting unit to be non-conductive with the power source and be conductive with the converter, and the converter is empowered by the battery unit.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
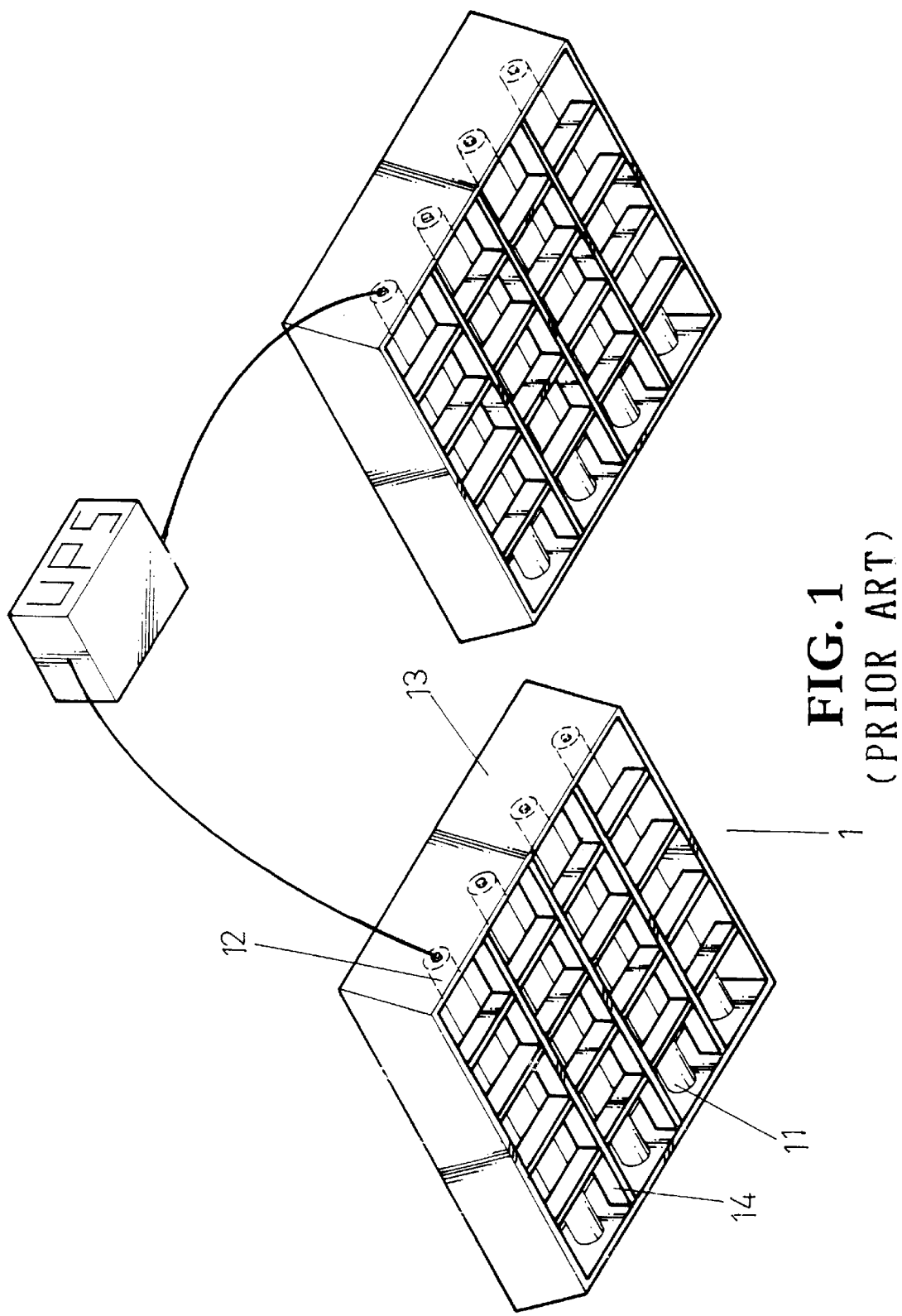
FIG. 1 is a perspective view of a conventional lighting device.
Figure 2:
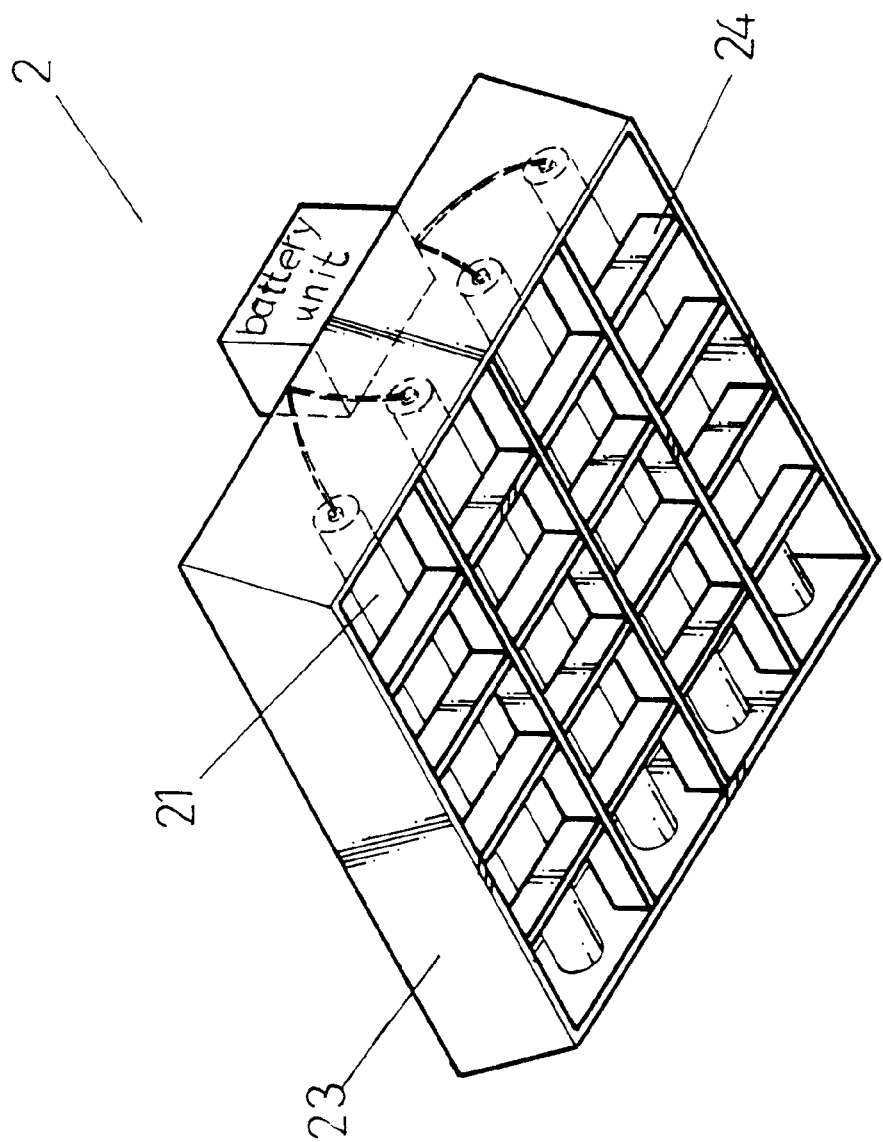
FIG. 2 is a perspective view of a lighting device in accordance with the present invention.
Figure 3:
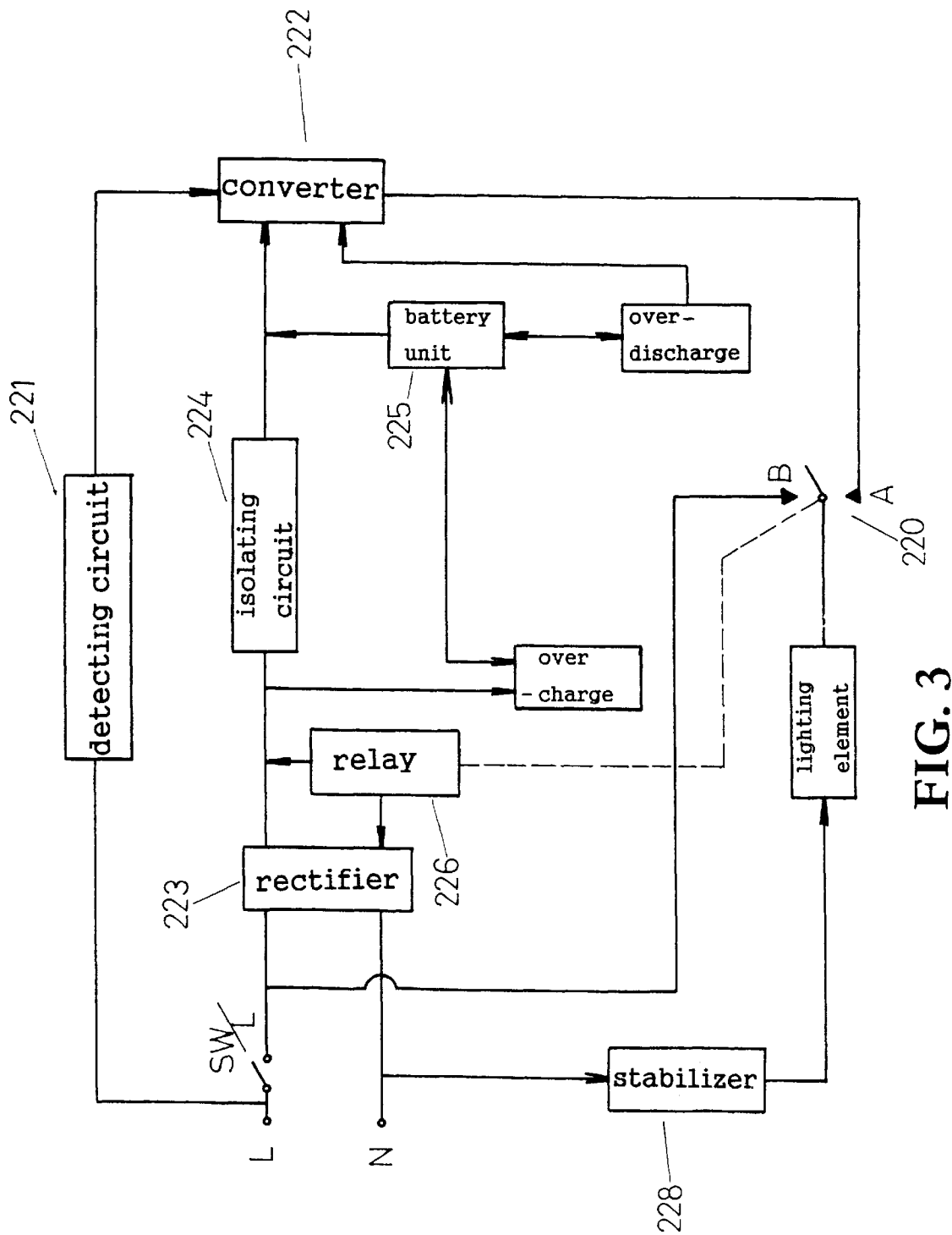
FIG. 3 is a circuit diagram for the lighting device in accordance with the present invention.

Referring to FIGS. 2 and 3, a lighting device 2 in accordance with the present invention generally includes a light base 23 and a light hood 24. The light base 23 includes a lighting unit 21 including at least one lighting element (such as a lamp or bulb) and a circuit board 22 mounted thereon. A stabilizer 228 is electrically connected to the lighting unit 21.

The circuit board 22 of the lighting device includes a detecting circuit 221 having a first end electrically connected to a power source and a second end electrically connected to a converter 222. The converter 222 includes a first end electrically connected to the detecting circuit 221 and a second end electrically connected to a switch 220 for selectively conducting the lighting unit 21 with the power source or the converter 222. In addition, the converter 222 is electrically connected to a battery unit 225. A rectifier 223 is mounted in front of the battery unit 225 and electrically connected to the power source. The battery unit 225 is electrically connected to the rectifier 223 so as to be charged at a normal illumination state. An isolating circuit 224 is electrically mounted between the battery unit 225 and the power source. A relay 226 is electrically connected to the switch 220 for selectively controlling conduction or non-conduction with the power source or the converter 222.

When at the normal illumination state, electric current from the power source passes through the stabilizer 228 to turn on the lighting unit 21. At the same time, the power source charges the battery unit 225.

When at an emergent illumination state, upon detection of interruption of service by the detecting circuit 221, the relay 226 activates the switch 220 of the lighting unit 21 to be non-conductive with the power source and be conductive with the converter 222. At the same time, the converter 222 is empowered by the battery unit 225. Thus, the battery unit 225 provides electricity during interruption of service. The lighting unit 21 for normal illumination is now used as a lighting source for emergency.

According to the above description, it is appreciated that the lighting unit 21 can be used for both normal and emergent use. The cost is thus reduced and installation is easy.

Although the invention has been explained in relation to its preferred embodiment, it is to be understood that many other possible modifications and variations can be made without departing from the scope of the invention as hereinafter claimed.

What is claimed is:

1. A lighting device comprising:

a lighting unit;

a stabilizer electrically connected to the lighting unit; and a circuit board comprising:

- a detecting circuit having a first end electrically connected to a power source and a second end;
- a converter including a first end electrically connected to the second end of the detecting circuit and a second end, the converter being electrically connected to a battery unit;
- a switch for selectively conducting the lighting unit with one of the power source and the converter;
- an isolating circuit electrically mounted between the battery unit and the power source; and
- a rectifier mounted in front of the battery unit and electrically connected to the power source, the battery unit being electrically connected to the rectifier so as to be charged during a normal illumination state;
- a relay electrically connected to the switch for selectively controlling conduction with one of the power source and the converter;

whereby when at the normal illumination state, electric current from the power source passes through the stabilizer to turn on the lighting unit, and the power source charges the battery unit;

whereby when at an emergent illumination state, upon detection of interruption service by the detecting circuit, the relay activates the switch of the lighting unit to be non-conductive with the power source and be conductive with the converter, and the converter is empowered by the battery unit.

* * * * *